E. D. PUTT.
MACHINE FOR TRIMMING TIRES.
APPLICATION FILED MAY 25, 1920.

1,417,627.

Patented May 30, 1922.

Witness:

Inventor
Edward D. Putt,
By G. L. Ely
Atty.

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

MACHINE FOR TRIMMING TIRES.

1,417,627.    Specification of Letters Patent.    Patented May 30, 1922.

Application filed May 25, 1920. Serial No. 384,096.

*To all whom it may concern:*

Be it known that I, EDWARD D. PUTT, a citizen of the United States, residing at Akron, in the county of Summit and State of Ohio, have invented certain new and useful Improvements in Machines for Trimming Tires, of which the following is a specification.

It is the object of this invention to improve upon my machine for trimming tires, Patent No. 1,263,286, April 16, 1918, to which reference should be made for a further understanding of the invention. The particular object of this invention is to improve the cutting knife rolls used in trimming the tires.

Another object of this invention is to produce a machine for trimming the edges of tires, in which the knives are tensioned under spring pressure, thereby requiring very little attention and eliminating the necessity of close adjustment.

The above and other objects of this invention will more fully appear from the following description and will be especially pointed out in the claims.

Figures 1, 2:
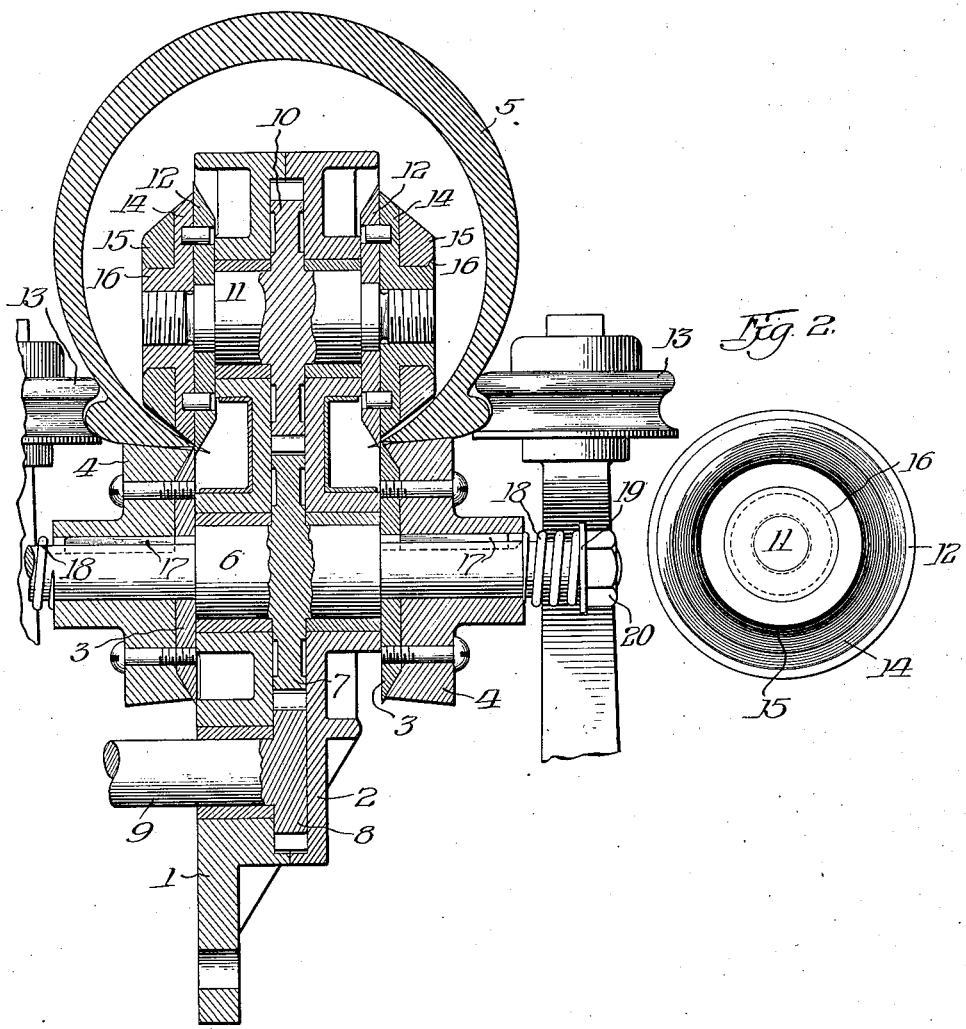
Fig. 1 is a vertical section transversely of the machine.
Fig. 2 is a detailed front view of one of the knives.

I have deemed it necessary to illustrate only that part of the machine with which my invention has to do. The housing 1, carried by any suitable table or bracket, not shown, forms bearing supports for the several rotative knives used in trimming the inner edges of the tire. 2 represents a cover plate for the housing 1 and has complementary journals therein to further aid in supporting the knife shafts.

The lower pair of knives 3 is journaled midway of the casing 1 on a shaft 6 and have secured to their outer faces a roller or cap plates 4, adapted to support the tire 5, the inner edges of the tire resting one on each of the rolls 4. Also mounted on the shaft 6 is a gear 7 in mesh with a pinion 8 on the drive shaft 9. From the gear 7 is driven another gear 10 which is on the shaft 11 of the upper pair of knives 12. The inside edges of the bead portion of the tire are fed between the knives 3 and 12 and are trimmed thereby. A pair of laterally movable rollers 13 conforming to the heel or outer edges of the beads, located on each side of the tire, are forced against the outside edges of the tire and press them inwardly toward the trimming knives. The tire is rotated by its frictional contact with the supporting rollers 4.

It has been found from practice, because the roller 12 being of greater distance or radius from the center of the tire 5 than the lower supporting rolls 4, that there is considerable "slippage" between the upper knife roll and the inside of the tire with which it contacts. On account of this continual slippage, the rolls soon wear down and have to be replaced with new ones, which involves considerable expense. The knife rolls 12 provided by this invention are made of two parts, 14 and 15, the cutting blade 12 being secured to the part 14. The part 15, which forms the outer engaging surface of the roll, is annular in shape and is rotatably mounted on the part 14 by the beveled flange 16. The parts 14 and 15 are freely revoluble independent of each other, the purpose of the part 15 being to compensate for the slippage that occurs as the tire is revolved and to allow that part of the roll to revolve without restriction.

The operation of this improved knife roller will be readily understood and it is apparent that the life of the machine will be lengthened and that a great amount of unnecessary labor will be saved in adjusting the tension of the knives.

In order to maintain a close engagement between the knives 3 and 12, the rollers 4 to which the knife 3 is secured is slidably mounted on the shaft 6 by a spline or feather 17 and the roll 4 is urged inwardly by a coil spring 18 bearing against the hub of the roller 4, the spring surrounding the shaft and being confined by washer 19 and nut 20. This arrangement is duplicated on both sides of the cutter bead, and as the knives 3 are located outside of the knives 12, a tight contact is preserved at all times and frequent regrinding and readjustment is unnecessary.

The features of novelty and improvement over the old machine construction will be readily perceived and understood. By these changes the wear on the upper rollers is reduced as the said rollers may turn freely by contact with the inside of the tire casing and the knives are kept in better cutting condition at all times.

I claim:

1. In a machine for trimming tire casings, a roller conforming to the heel of the bead, second and third rollers conforming respectively to the inside and outside lower edges of the casing, said second named roller having a freely rotatable tire engaging portion, and a knife at the rear of the last two rollers.

2. In a machine for trimming tire casings, a pair of oppositely faced feeding rollers adapted to conform to the lower outside edge of a tire casing, a second pair of rollers inside the lower edges of the tire casing, and knives attached to each of said rollers, said second pair of rollers being made of two parts each revoluble independent of the other, one of said parts adapted to engage the inside of the tire casing, and the other part attached to a knife.

EDWARD D. PUTT.